United States Patent
Natarajan et al.

(10) Patent No.: US 9,369,756 B2
(45) Date of Patent: Jun. 14, 2016

(54) SELECTIVELY BLOCKING THE RECORDING OF CONTENTS AVAILABLE ALSO ON DEMAND

(71) Applicant: Verizon Patent and Licensing Inc., Arlington, VA (US)

(72) Inventors: Deepak Natarajan, Tamil Nadu (IN); Aravind Vaidhyanathan, Tamil Nadu (IN); Vijayan Radhakrishnan, Tamil Nadu (IN); JanardhanReddy Tripuram, Telagana (IN); Venkatesan M. Sriraman, Tamil Nadu (IN); Sivasubramanian Parthasarathy, Pondicherry (IN); Kavitha PanneerSelvam, Tamil Nadu (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/462,850

(22) Filed: Aug. 19, 2014

(65) Prior Publication Data

US 2016/0057483 A1  Feb. 25, 2016

(51) Int. Cl.
*H04N 21/4147* (2011.01)
*H04N 21/433* (2011.01)
*H04N 21/41* (2011.01)
*H04N 21/435* (2011.01)
*H04N 21/472* (2011.01)
*H04N 21/436* (2011.01)

(52) U.S. Cl.
CPC ....... *H04N 21/4334* (2013.01); *H04N 21/4135* (2013.01); *H04N 21/435* (2013.01); *H04N 21/43622* (2013.01); *H04N 21/47202* (2013.01)

(58) Field of Classification Search
CPC .......... H04N 21/4334; H04N 21/4135; H04N 21/435; H04N 21/43622; H04N 21/47202; G06Q 20/405; G06Q 30/0601
See application file for complete search history.

(56) References Cited

U.S. PATENT DOCUMENTS

| | | | | |
|---|---|---|---|---|
| 8,526,610 | B2* | 9/2013 | Shamoon | H04L 63/0428 360/60 |
| 2007/0183746 | A1* | 8/2007 | Haeuser | H04N 21/4334 386/214 |
| 2008/0159714 | A1* | 7/2008 | Harrar | H04N 5/782 386/291 |
| 2008/0163286 | A1* | 7/2008 | Rudolph | H04N 21/422 725/28 |
| 2010/0058401 | A1* | 3/2010 | Beyabani | H04N 7/17318 725/93 |
| 2011/0299836 | A1* | 12/2011 | Amsterdam | H04N 5/765 386/295 |
| 2012/0192234 | A1* | 7/2012 | Britt | H04N 5/782 725/58 |
| 2012/0204215 | A1* | 8/2012 | Hayashi | H04N 21/23106 725/88 |
| 2014/0006951 | A1* | 1/2014 | Hunter | H04N 21/47202 715/719 |

* cited by examiner

*Primary Examiner* — James R Sheleheda
*Assistant Examiner* — Alexander Boyd

(57) ABSTRACT

A device receives a request for a digital video recorder (DVR) to record digital contents. The device identifies the digital contents using metadata included in the request, such as a channel and a time associated with the digital contents, to access additional metadata from an electronic program guide (EPG), such as an identifier. The device uses the additional metadata from the EPG to determine whether the digital contents are available via video on demand (VOD). For example, the device may compare the identifier and/or other metadata for the digital contents to metadata associated with VOD content, such as a VOD catalog. The device may selectively prevent the DVR from recording the digital contents if the digital contents are available via VOD.

20 Claims, 11 Drawing Sheets

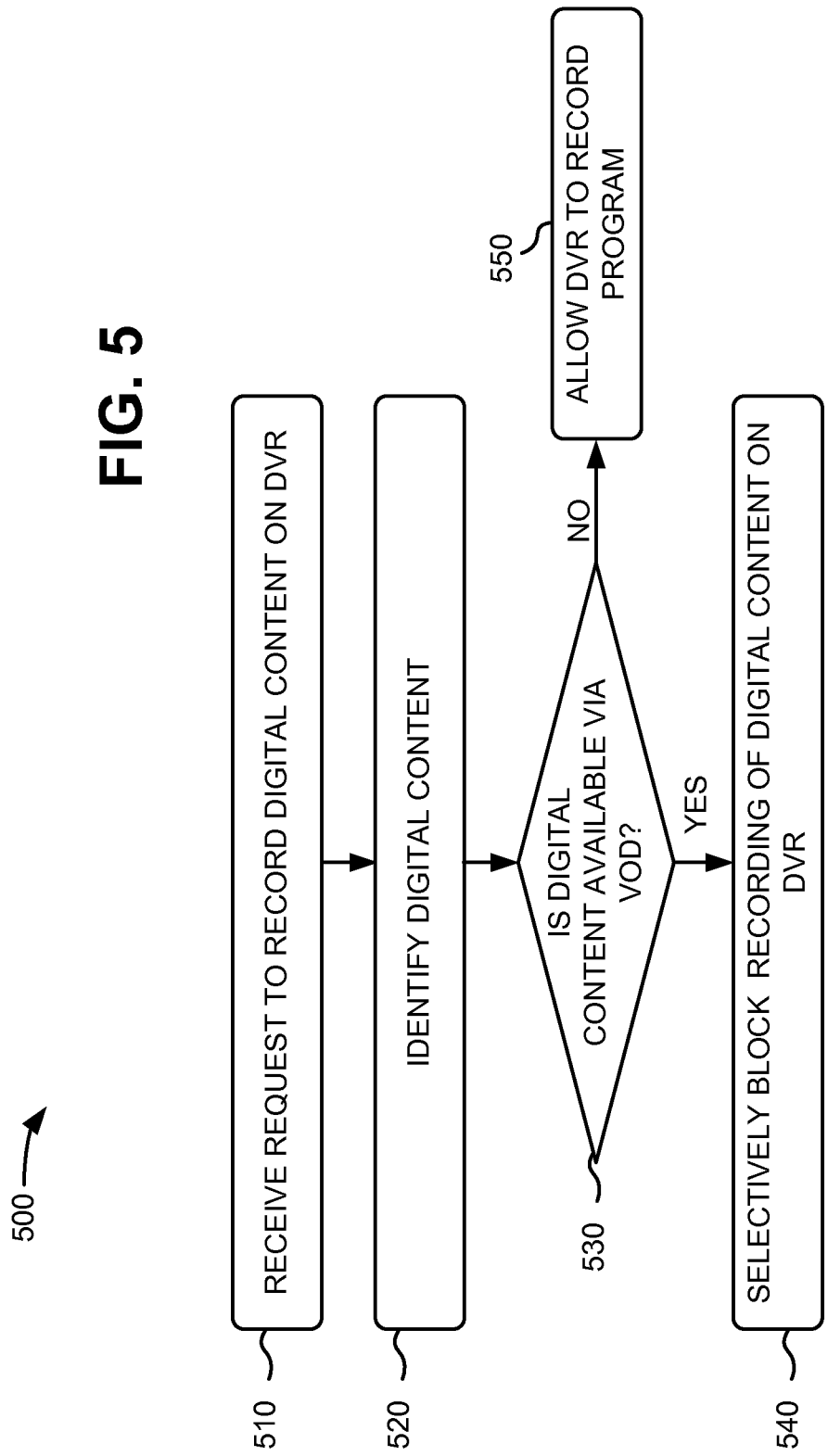

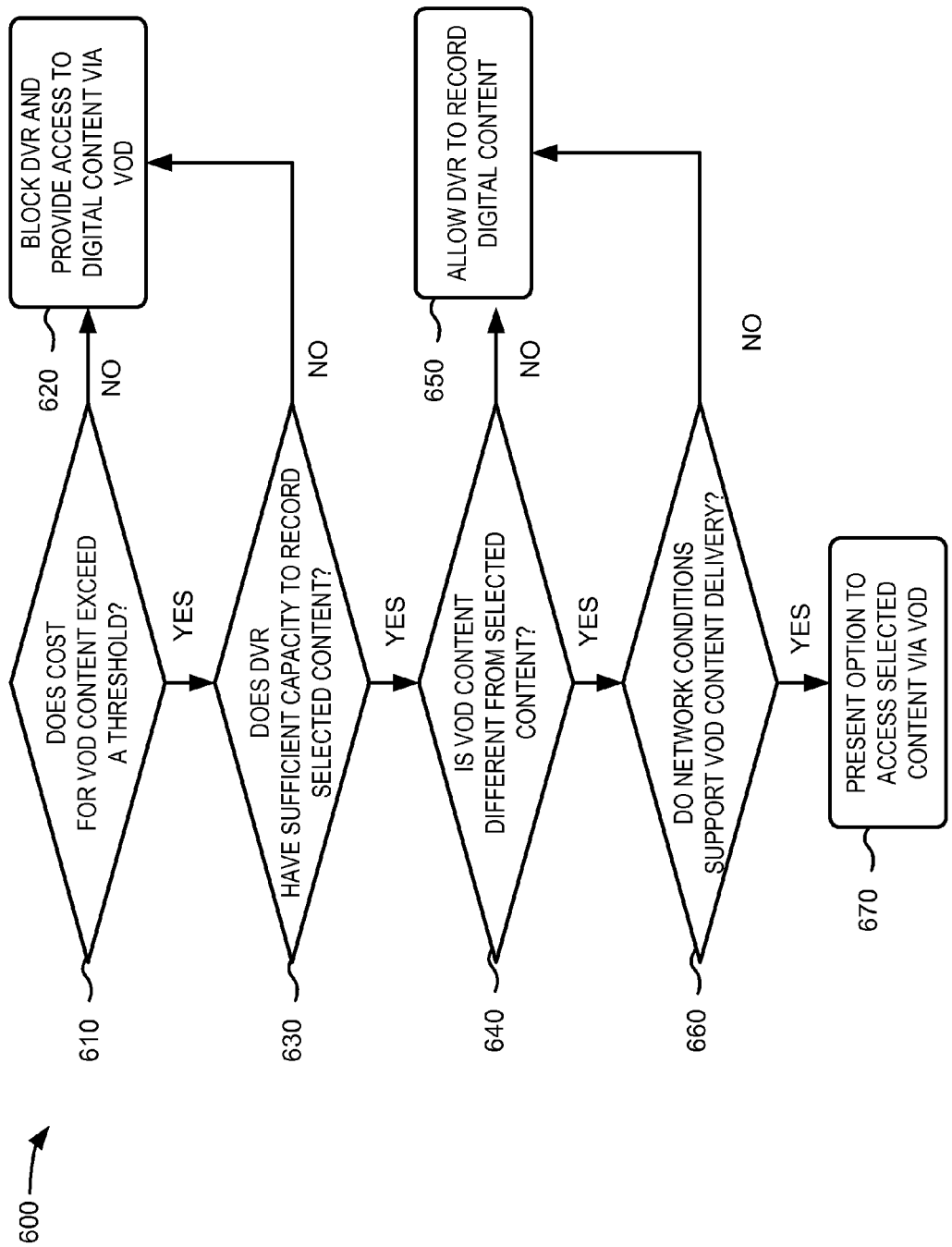

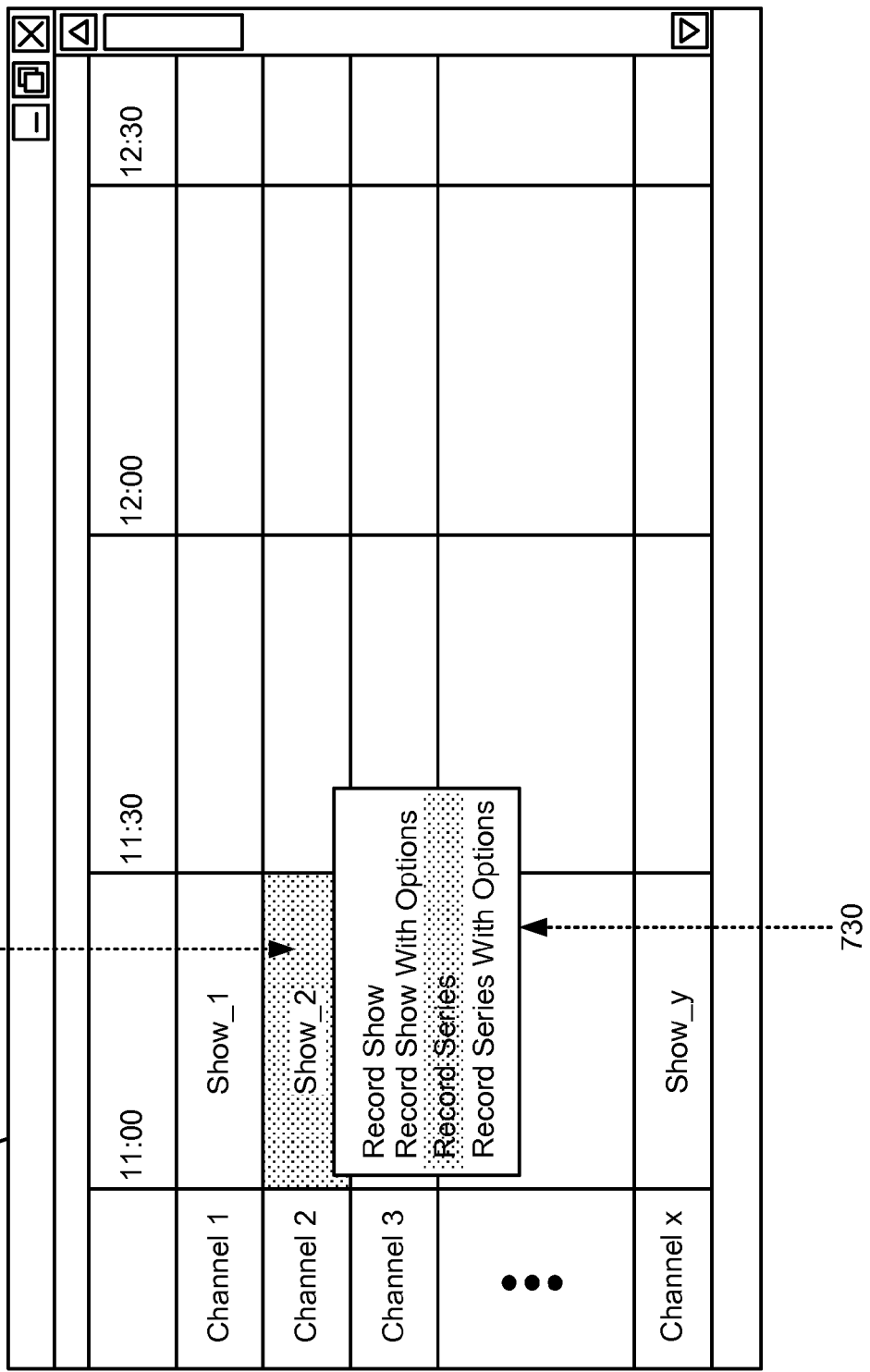

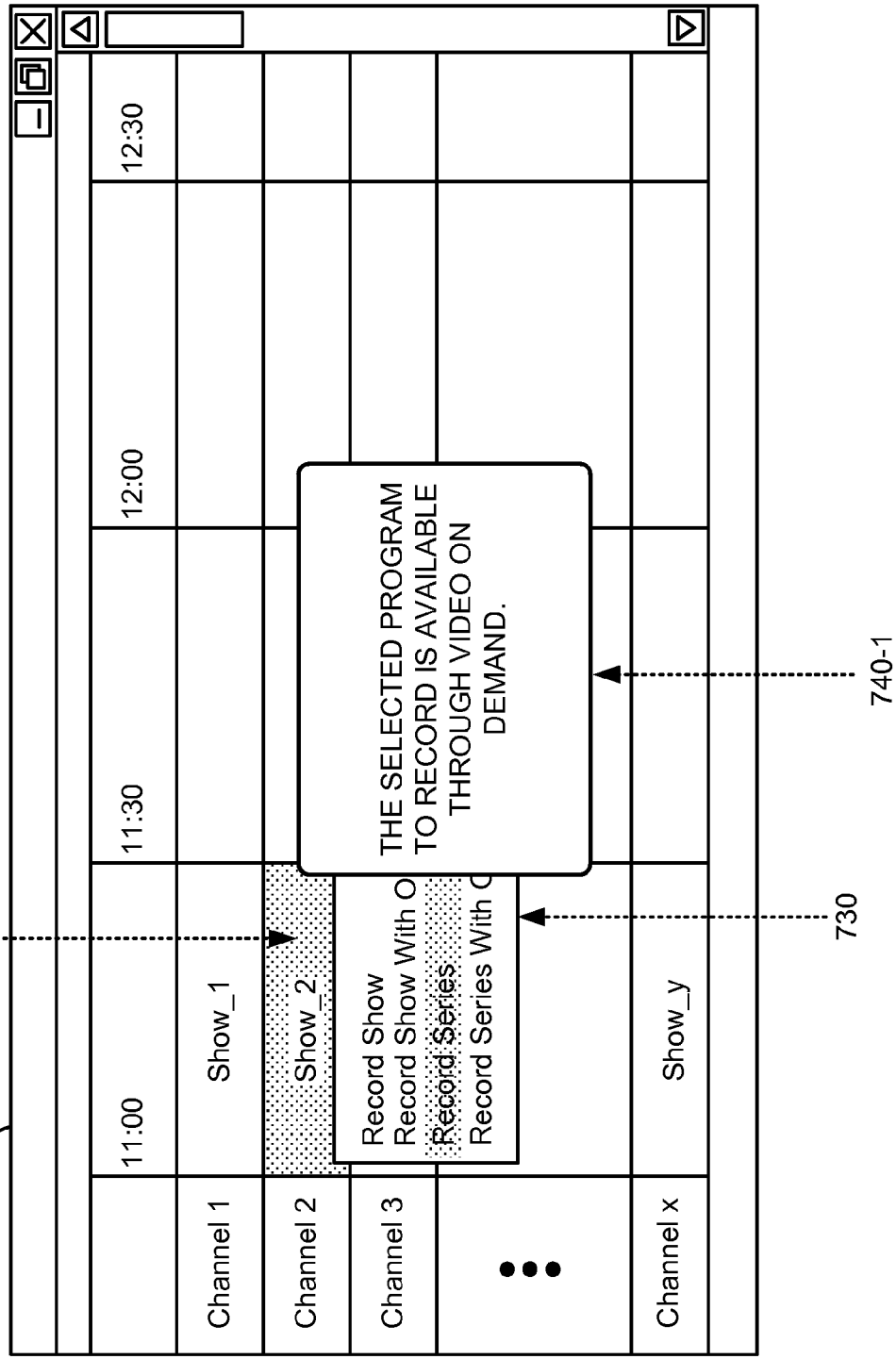

SELECTIVELY BLOCKING THE RECORDING OF CONTENTS AVAILABLE ALSO ON DEMAND

BACKGROUND

Set-Top Boxes (STBs) may provide digital contents associated with a subscription television service received via a network, such as a cable network and/or an optical fiber network. For example, the STBs may receive multicast stations and/or video-on-demand (VOD) contents provided through the subscription television service. Digital contents received via the multicast stations may be edited, for example, to include commercials, fit within desired broadcast times, conform to broadcast regulations, reduce the bandwidth for transmitting the multicast channels, etc.

The STBs may perform various processing of the received digital content, such as to decode the digital contents, perform digital rights management and authentication control functions (e.g., decryption of the digital contents), etc. and provide the processed digital contents for presentation on display devices (e.g., televisions) connected to the STBs. A user may use an input device, such as a remote control device, to provide an input to the STB to switch channels, configure the STB (e.g., turning on closed captioning, modifying audio/vision output formats, etc.), and/or control other functions on the STB. For example, a user may submit an input related to controlling a digital video recorder (DVR) associated with the STB, accessing an electronic programming guide (EPG) identifying contents available via the channels, accessing a VOD catalog identifying contents available via VOD, and/or activating other functions (e.g., widgets) available via the STB.

BRIEF DESCRIPTION OF THE DRAWINGS

FIGS. 5 and 6 show exemplary processes for selectively blocking a command for a DVR to record digital contents when the digital contents are also available via VOD, according to one implementation;

FIGS. 7A-7E shown exemplary displays that may be generated by the STB and presented by a display device included in the environment of FIG. 1, according to one implementation.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In exemplary embodiments described herein, a user device, such as an STB, may receive a request for a DVR to record digital contents. The user device may identify the digital contents by using metadata included in the request (e.g., data identifying a station and a time associated with the digital contents), to access additional metadata included in an EPG, such as an identifier for the digital contents. The user device may further determine whether the digital contents are available via VOD. For example, the user device may compare the identifier and/or other metadata for the digital contents to metadata associated with VOD content, such as a VOD catalog. As further described herein, the user device may selectively prevent the DVR from recording the digital contents if the digital contents are available via VOD. For example, the record command to the DVR may be blocked and, instead, the user device may provide an interface to access the digital contents via VOD.

As used herein, "digital contents" is intended to be broadly defined to include documents, e-books, audio, video and games, or other data that are stored in a digital format.

Figure 1:
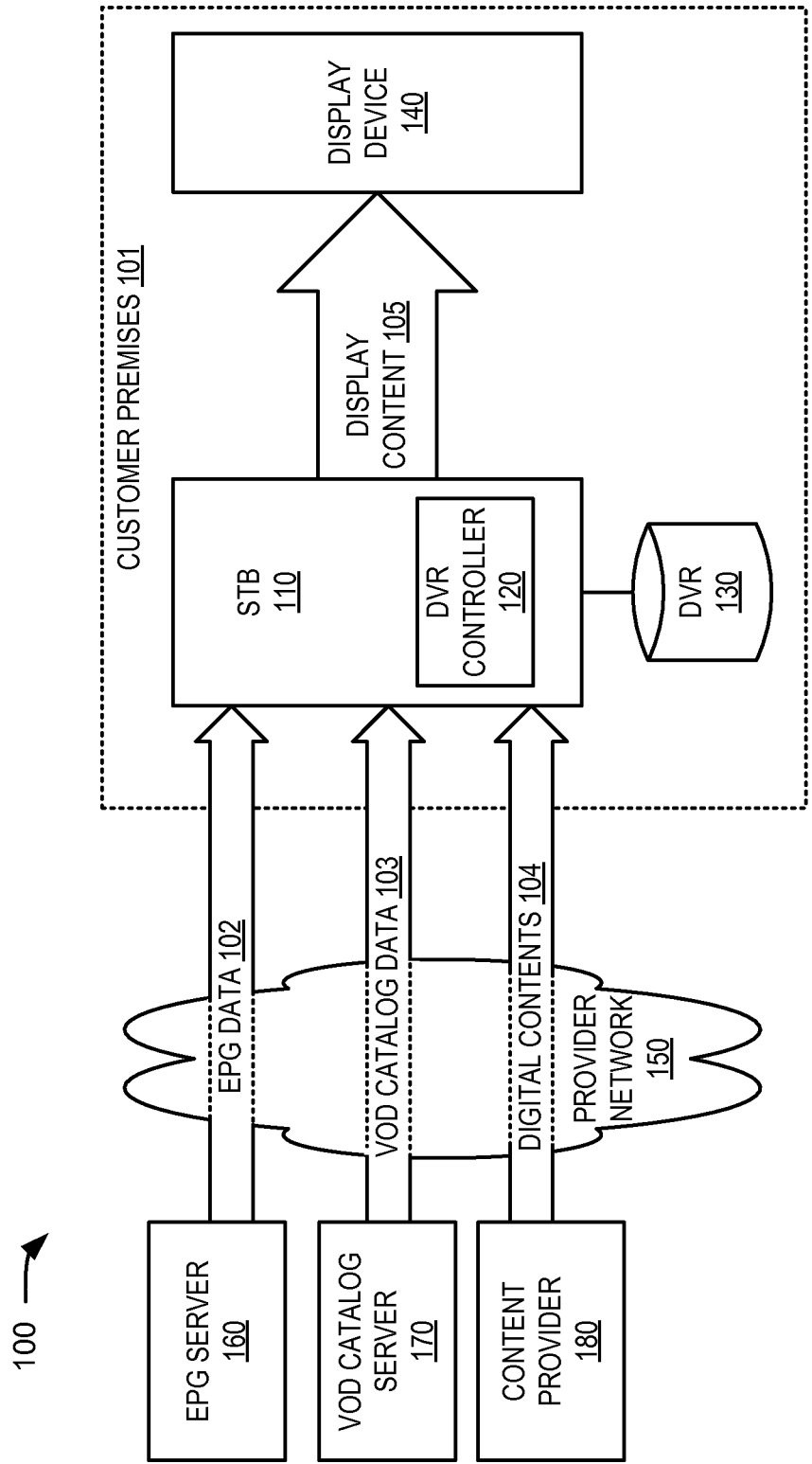
FIG. 1 shows an exemplary environment for selectively blocking a command for a DVR to record digital contents when the digital contents are also available via VOD, according to one implementation.

FIG. 1 shows an exemplary environment 100 in which a command for a DVR to record digital contents may be selectively blocked if the digital contents are also available via VOD. As shown in FIG. 1, environment 100 may include, for example, a customer premises 101 that, in turn, may include an STB 110, a DVR controller 120, a DVR 130, and a display device 140. As further shown in FIG. 1, environment 100 may also include, for example, a network 150; an EPG server 160 that provides EPG data 102 to STB 110; a VOD catalog server 170 that provides VOD catalog data 103 to STB 110; and a contents source 180 providing digital contents 104 to STB 110.

As described herein, STB 110 may provide display contents 105 that selectively include, for example, portions of EPG data 102, VOD catalog data 103, and/or digital contents 104. For example, STB 110 may receive a request for one or more of EPG data 102, VOD catalog data 103, and/or digital contents 104, and STB 110 may generate display contents 105 by decoding, decrypting, and/or formatting one or more of EPG data 102, VOD catalog data 103, or digital contents 104. STB 110 may include a device that includes, for example, an input component to receive EPG data 102, VOD catalog data 103, and digital contents 104 via network 150. STB 110 may further include a tuner to access a portion of digital contents 104 (e.g., to provide the particular digital contents for recording by DVR 130).

DVR controller 120 may include, for example, hardware and/or software to control operation of DVR 130. For example, if a user submits a request for recording particular digital contents at a particular time using DVR 130, DVR controller 120 may process the request by causing STB 110 (e.g., by forwarding a first command to STB 110) to provide the requested particular digital contents at the particular time and causing DVR 130 (e.g., by forwarding a second command to DVR 130) to record (e.g., store data associated with) the selected program.

In an implementation described herein, a user may submit a request to STB 110 and/or DVR 130 to record digital contents using DVR 130. DVR controller 120 may identify the requested digital contents and may determine whether the requested digital contents (e.g., documents, e-books, audio, video and games, or other data that are stored in a digital format) are also available on demand (e.g., as VOD contents). For example, DVR controller 120 may access EPG data 102 to identify the requested digital contents and may access VOD catalog data 103 to determine whether the identified digital contents are available via VOD.

DVR controller 120 may further selectively prevent DVR 130 from recording the digital contents. For example, DVR controller 120 may send a message or an instruction to STB 110 to stop STB 110 from providing the requested digital contents (e.g., outputting an associated particular channel at a particular time) to DVR 130. Additionally or alternatively, DVR controller 120 may send a message or an instruction to DVR 130 to prevent DVR 130 from recording the requested digital contents. For example, DVR controller 120 may deactivate DVR 130, cancel the request to record the selected digital contents, cause DVR 130 to perform other actions (e.g., record different contents), cause STB 110 to not provide the requested digital contents to DVR 130, etc.

DVR controller 120 may cause STB 110 to present information (e.g., in display contents 105) indicating that the requested contents are available via VOD (e.g., as described below with respect to FIG. 7B). DVR controller 120 may further cause STB 110 to present an indication, such as an error message, if DVR 130 is prevented from recording the requested digital contents due to the digital contents being available via VOD (e.g., as described below with respect to FIG. 7C). In one implementation, DVR controller 120 may further forward a message or instruction to STB 110 to initiate access to the requested digital contents (e.g., the documents, e-books, audio, video and games, or other data that are stored in a digital format) on demand (e.g., as described below with respect to FIG. 7D). For example, DVR controller 120 may signal STB 110 to present an on-demand menu providing information related to accessing the requested digital contents through on-demand.

In the implementation shown in FIG. 1, DVR controller 120 may be included in STB 110. It should be appreciated, however, that DVR controller 120 may be included in a device that is separate from STB 110. For example, DVR controller 120 may be included in another component of customer premises 101, such as in a broadband home router or BHR (not shown), another STB 110, DVR 130, display device 140, etc. In addition or alternatively, DVR controller 120 may be located remotely from customer premises 101, such as on an application server (not shown) that connects to STB 110 and/or DVR 130 via provider network 150.

DVR 130 may include storage to access and store digital contents presented on a selected channel at a particular time. For example, DVR 130 may include a memory to store digital decoded by STB 110. DVR 130 may further process the digital content for storage and/or process the stored content for presentation. DVR 130 may also resolve conflicts in instructions, such as mediate commands to record different contents on different channels at the same time.

Display device 140 may include a digital or analog display via which a user may view multimedia contents (including, for example, VOD content). Display device 140 may be any device that can receive and display multimedia contents delivered over network 150 and/or through STB 110.

Network 150 may include, for example, a network that distributes or makes available services, such as, for example, television services, mobile communication services, and/or Internet services. Network 150 may be a satellite-based network and/or a terrestrial-based network. In implementations described herein, network 150 may support on-demand (e.g., VOD) services. Network 150 may include one or more networks of various types including, for example, a cable network (e.g., an optical cable network), a satellite network, a telecommunications network (e.g., a Public Switched Telephone Network (PSTN) or Public Land Mobile Network (PLMN)), an Advanced Television Systems Committee (ATSC) standards network, a local area network (LAN), a wide area network (WAN), a metropolitan area network (MAN), an intranet, the Internet and/or wireless technologies, such as WiFi, WiMax, 2G, 2.5G, 3G, 3.5G, 4G, etc. Network(s) 150 may, in some implementations, include one or more QAM channels (or other types of modulated or broadcast channels) for delivering EPG data 102, VOD catalog data 103, and digital contents 104 to STB 110.

EPG server 160 may deliver EPG data 102 that includes various information related to the display of an EPG through STB 110. An EPG, as referred to herein, may include menus of television program scheduling information that are shown by a contents service provider (e.g., cable or satellite TV provider) to a viewer and that displays current and upcoming programming. An EPG may permit a user to navigate through scheduling information interactively, selecting and identifying TV programming by time, station, or title. An EPG may enable the user to identify desired programming using interactive menus, and a user may interact with STB 110 via the EPG to schedule the recording of the desired programming by DVR 130 or may interact with EPG data 102 available to smart phones, tablets, personal computers, laptops, digital pads, etc. to schedule the recording of a desired program by DVR 130.

VOD catalog server 170 may include one or more network devices, or other types of computation or communication devices, to provide VOD catalog data 103 to identify on-demand contents (e.g., documents, e-books, audio, video and games, or other data that are stored in a digital format) available for users (e.g., a user associated with customer premises 101) to consume (e.g., buy or rent). In one implementation, VOD catalog server 170 may collect and/or present listings of digital contents available for a particular a recipient user (e.g., a based on subscription packages, physical equipment, associated with the recipient user account, etc.). For example, VOD catalog server 170 may receive contents metadata, such as lists or categories of VOD content, from contents delivery system 180. VOD catalog server 170 may use the contents metadata to provide currently-available contents options to STB 110 and/or smart phones, tablets, personal computers, laptops, digital pads, etc., in which a user can log into his account. Although FIG. 1 shows that VOD catalog server 170 may provides VOD catalog data directly to STB 110, VOD catalog server 170 may also communicate with STB 110 indirectly (not shown), such as by forwarding VOD catalog data 104 to contents delivery system 180 which, in turn, may deliver the VOD catalog data 103 to STB 110 as digital contents 104 to be displayed on display device 140.

Contents provider 180 may include one or more network devices, or other types of computation or communication devices, that store and deliver contents to customers (e.g., to STB 110 at customer premises 101). Contents provider 180 may deliver the digital contents 104 (e.g., documents, e-books, audio, video and games, or other data that are stored in a digital format) to STB 110 via one or more channels (e.g., Quadrature Amplitude Module (QAM) channels) over network 150. Digital contents 104 may include, for example, television broadcasts, VOD programming, and/or other video contents.

The configuration of components of environment 100 illustrated in FIG. 1 is for illustrative purposes only, and other configurations may be implemented. For example, environment 100 may include additional, fewer and/or different components than those depicted in FIG. 1. For example, environment 100 may include a remote user device (not shown) that is located away from customer premises 101, and the remote user device may submit a request to STB 110 and/or DVR 130 to record a particular program.

Figure 2:
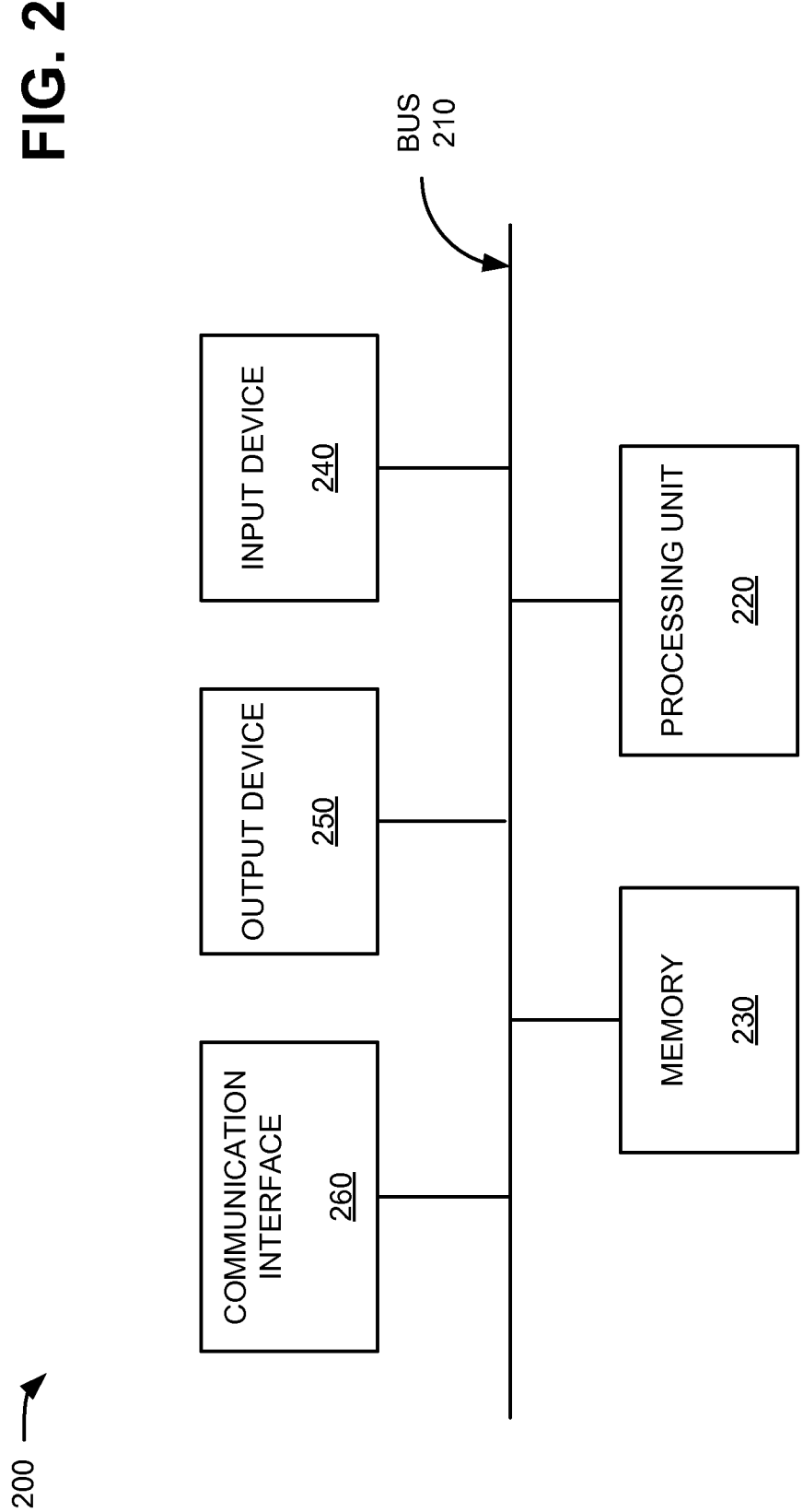
FIG. 2 shows exemplary components of a device included in the environment of FIG. 1 according to one implementation.

FIG. 2 is a diagram of exemplary components of a device 200 that may be replicated into a plurality of devices, each of which may correspond, respectively, to one or more devices of environment 100 shown in FIG. 1, such as STB 110, DVR controller 120, DVR 130, display device 140, a device (e.g., an intermediate node, router, etc.) of network 150, EPG server 160, VOD catalog server 170, and/or contents source 180. In one exemplary implementation, one or more of the devices of environment 100 may include one or more devices 200 or one or more components of device 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application-specific integrated circuits (ASICs), field-programmable gate array (FPGAs), etc.

Memory 230 may include a random-access memory (RAM) or another type of dynamic storage device that stores information and instructions for execution by processing unit 220, a read-only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touch screen display, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of environment 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than those depicted in FIG. 2. Alternatively, or additionally, one or more components of device 200 may perform one or more other tasks described as being performed by one or more other components of device 200.

Figure 3:
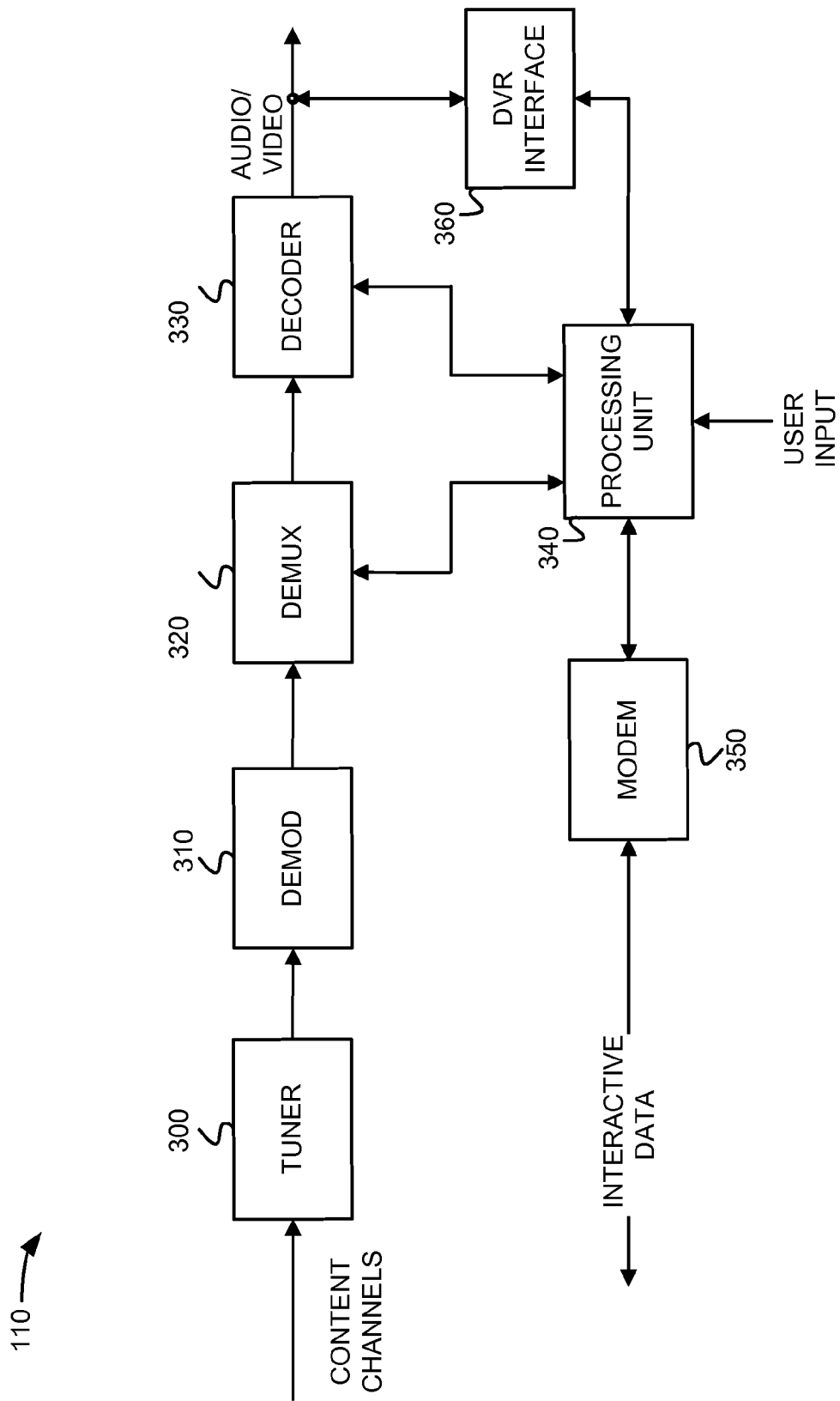
FIG. 3 shows exemplary components of an STB included in the environment of FIG. 1 according to one implementation.

FIG. 3 depicts exemplary components of STB 110. As shown in FIG. 3, STB 110 may include, for example, a tuner 300, a demodulator 310, a demultiplexer 320, a decoder 330, a processing unit 340, a modulator/demodulator (modem) 350, and a DVR unit 360. Tuner 300 may select and tune to specific digital contents (e.g., documents, e-books, audio, video and games, or other data that are stored in a digital format) by tuning to one of many different mulitcast input channels. Each of the input channels may be digitally modulated using, for example, QAM, or other type of modulation, and demodulator 310 may demodulate the information in the channel selected by tuner 300 to produce a transport stream, such as an MPEG-2 or MPEG-4 transport stream corresponding to containing the audio, video and/or other information related to selected digital contents to be presented by display device 140 (FIG. 1).

Continuing with FIG. 3, demultiplexer 320 may select and decrypt compressed audio and video from the transport stream for display by display device 140. Decoder 330 may decode and decompress the decrypted audio and video information for the selected digital contents (e.g., display data 104). Processing unit 340 may include, for example, a microprocessor that controls the operations performed by tuner 300, demodulator 310, demultiplexer 320, decoder 330, modem 350 and DVR interface 360 based on user input (e.g., input received by STB 110 via a remote control device). Modem 350 may send and receive interactive data (e.g., EPG data 102 and/or VOD catalog data 103) that may be processed by processing unit 340. DVR interface 360 may enable STB 110 to exchange digital contents data and instructions to DVR 130, such as to provide decrypted audio and video information (e.g., digital contents data 104) to DVR 130 to digitally record and store audio and video contents associated with the particular digital contents decoded by decoder 330. Similarly, STB 110 may receive recorded digital contents data from DVR 130 and may provide related display data for display by display device 140.

Although FIG. 3 shows exemplary components of STB 110, in other implementations, STB 110 may include fewer components, different components, differently arranged components, or additional components than those depicted in FIG. 3. For example, STB 110 may, instead of receiving receive EPG data 102 from EPG server 160 and/or VOD catalog data 103 from VOD catalog server 170, STB may include one or more components to process (e.g., to perform visual and/or audio analysis of) digital contents 104 to identify the particular digital contents carried by a selected channel at a particular time and/or the VOD contents. Alternatively or additionally, one or more components of STB 110 may perform one or more other tasks described as being performed by one or more other components of STB 110.

Figure 4:
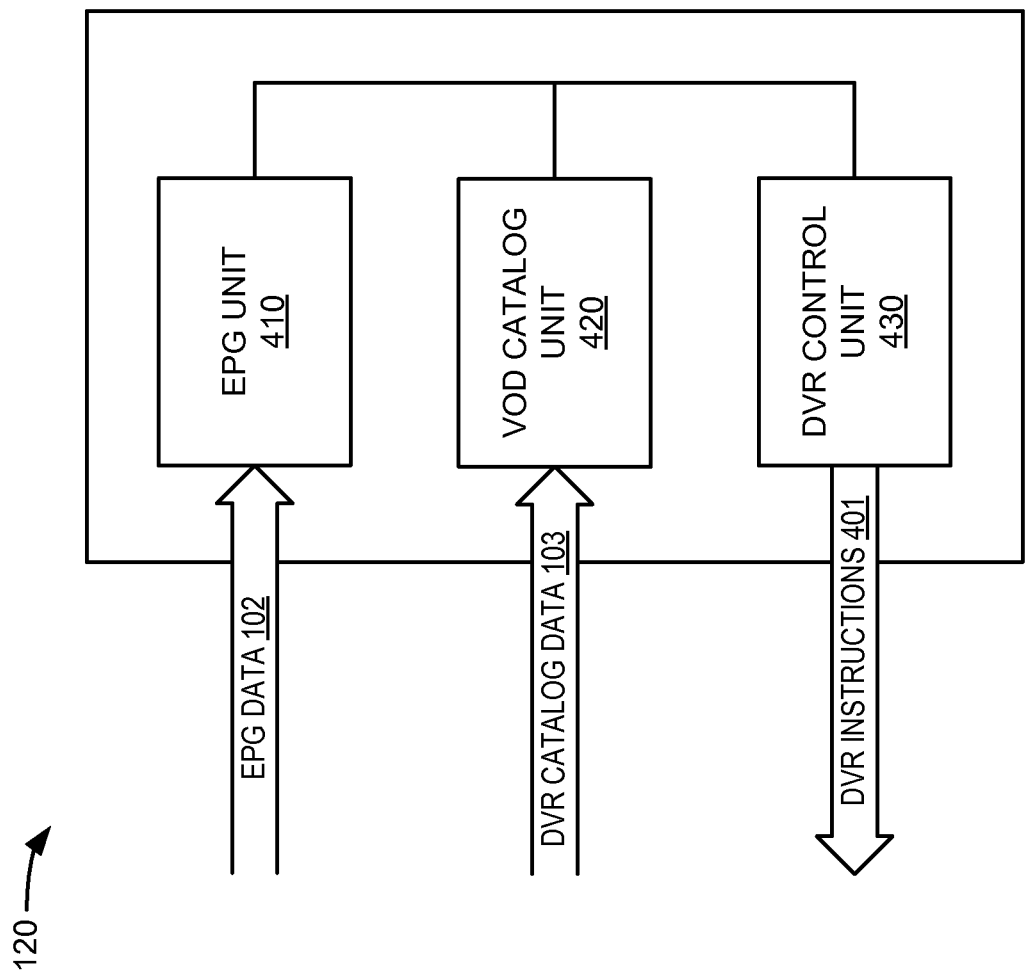
FIG. 4 shows exemplary functional components of a DVR control device included in the environment of FIG. 1 according to one implementation.

FIG. 4 is a schematic diagram showing exemplary functional components of DVR controller 120. The functional components shown in FIG. 4 may be implemented in hardware and/or software within DVR controller 120. For example, in one implementation, the functional components of FIG. 4 may be implemented as instructions stored in memory 230 that are executed by processing unit 220. The functional components of DVR controller 120 may include, for example, an EPG unit 410, a VOD catalog unit 420, and a DVR control unit 430.

EPG unit 410 may receive EPG data 102 (e.g., from EPG server 160) and may provide program scheduling data to DVR control unit 430. VOD catalog unit 420 may receive VOD catalog data 103 (e.g., from VOD catalog server 170) and may provide data identifying available on-demand contents (e.g., documents, e-books, audio, video (e.g., VOD) and games, or other data that are stored in a digital format) to DVR control unit 430. DVR control unit 430 may process the program scheduling data (from EPG unit 410), in connection with a request (e.g., from an input received from user to STB 110) to record particular digital contents on a particular channel at a particular time. For example, DVR control unit 430 may process the program scheduling data to determine an identifier and/or other metadata for the particular digital contents. DVR control unit 430 may process the data identifying available VOD digital contents (from VOD catalog unit 420) to determine whether the identified digital contents are available via VOD. For example, DVR control unit 430 may compare the identifier for the particular digital contents (to be recorded) to identifiers for contents available through VOD. Additionally or alternatively, DVR control unit 430 may compare the other metadata (e.g., actors, directors, production year, summary, genre, etc.) to determine if the identifier for the request digital contents corresponds to an identifier for VOD contents.

Based on the comparison of the program scheduling data from EPG unit 410 and the data identifying available VOD digital contents from VOD catalog unit 420, DVR control unit 430 may generate DVR commands 401 to DVR 130 for selectively blocking the recording of the particular digital contents by DVR 130 when the particular digital contents are available via VOD. DVR commands 401 to DVR 130 may include instructions to authorize recording of the requested digital contents when, for example, the particular digital contents are not available via VOD.

Although FIG. 4 shows exemplary components function components of DVR controller 120, in other implementations, DVR controller 120 may include fewer functional components, different functional components, differently arranged functional components, or additional functional components than those depicted in FIG. 4. For example, DVR controller 120 may not include EPG unit 410 and/or VOD catalog unit 420 and may, instead, receive the program scheduling data and/or the data identifying available VOD digital contents from STB 110. Alternatively, or additionally, one or more function components of DVR controller 120 may perform one or more other tasks described as being performed by one or more other components of DVR controller 120.

FIG. 5 is a flow diagram of an exemplary process 500 for processing a request for DVR 130 to record particular digital contents. Process 500 is described with respect to components in environment 100 and/or the components of DVR controller 120 in FIG. 4. In one implementation, process 500 may be performed by DVR controller 120. Alternatively, or additionally, some or all of process 500 may be performed by another device or group of devices, including or excluding DVR controller 120.

As shown in FIG. 5, process 500 may include receiving a request to record digital contents (documents, e-books, audio, video and games, or other data that are stored in a digital format) on DVR 130. For example, a user may submit an input (e.g., via a remote control device) to STB 110 requesting record digital contents, and STB 110 may forward data associated with that request to DVR controller 120. For example, the user may submit a request to record the digital contents currently being presented on display device 140. In another example, the user may access an EPG to select digital contents being presented on a channel at a current and/or future time. In this example, the user may request recording a single program or multiple programs (e.g., a series being broadcast on a channel during multiple times). Alternatively, the request to record the digital contents may be generated, for example, by STB 110 without receiving a user input (e.g., based other factors such as the user's prior viewing history, transactions details, etc.).

As shown in FIG. 5, process 500 may further include identifying the digital contents (e.g., documents, e-books, audio, video and games, or other data that are stored in a digital format) to be recorded by DVR 130 (block 520). For example, DVR controller may parse the request to extract an identifier or other metadata associated with the digital contents. Even if the request does not include an identifier for the digital contents, DVR controller 120 may use the metadata (e.g., a channel and broadcast time associated with digital contents) to identify the digital contents. For example, EPG unit 410 may receive EPG data 102 (e.g., from EPG server 160) and may provide program scheduling data to DVR control unit 430. DVR control unit 430 may process the program scheduling data determine an identifier and/or other metadata for the particular digital contents (e.g., actors, a director, producer, release year, genre, plot summary, etc.) associated with the digital contents.

Continuing with FIG. 5, process 500 may include determining whether the digital contents (e.g., documents, e-books, audio, video and games, or other data that are stored in a digital format) are available via on-demand (block 530). For example, VOD catalog unit 420 may receive VOD catalog data 103 (e.g., from VOD catalog server 170) and may provide data identifying available VOD digital contents to DVR control unit 430. DVR control unit 430 may process the data identifying available VOD digital contents (from VOD catalog unit 420) to determine whether the digital contents are available via VOD. For example, DVR control unit 430 may compare the identifier for the particular digital contents to be recorded to identifiers for contents available through VOD. Additionally or alternatively, DVR control unit 430 may compare the other metadata (e.g., the actors, the director, the producer, the release year, the genre, the plot summary, etc. associated with the digital contents) to determine if metadata for the request digital contents corresponds to metadata for any VOD contents.

As shown in FIG. 5, process 500 may include selectively blocking the recording of the digital content by DVR 130 (block 540) if the digital contents are available via VOD (block 530—Yes), or alternatively allowing DVR 130 to record the digital contents (block 550) if the digital contents are not available via VOD (block 530—No). For example, DVR control unit 430 may generate DVR commands 401 to DVR 130 to selectively block recording of the particular contents by DVR 130 when the particular digital contents are available as VOD contents. Otherwise, DVR control unit 430 may forward DVR commands 401 to DVR 130 to authorize recording of the requested digital contents (e.g., programming appearing on a particular channel at a particular time.)

FIG. 6 is a flow diagram of an exemplary process 600 for selectively blocking the recording of the digital content by DVR 130 in block 540 if the digital contents are available via VOD. Process 600 is described with respect to components in environment 100 and/or the components of DVR controller 120 in FIG. 4. In one implementation, process 600 may be performed by DVR controller 120. Alternatively, or additionally, some or all of process 600 may be performed by another device or group of devices, including or excluding DVR controller 120.

As shown in FIG. 6, process 600 may include determining whether a cost for accessing the digital contents via VOD exceeds a threshold amount (block 610) and if the VOD costs do not exceed the threshold cost (block 610—No), blocking recording of the digital contents by the DVR and, instead, providing access to the digital content via VOD (block 620). For example, DVR control unit 430 may parse the VOD data (e.g., received from VOD catalog unit 420) to determine a cost associated with accessing the digital contents via VOD (e.g., a rental and/or purchase fee, a subscription cost, etc). For example, DVR control unit 430 may identify a content provider associated with accessing the digital contents via VOD, and DVR control unit 430 may determine a cost with accessing VOD content through the content provider. In certain examples, the content provider may offer VOD access to the digital contents to particular users (e.g., subscribers of a channel or services associated with the content provider) at a reduced or no cost, and DVR control unit 430 may access a customer profile to determine whether the user is a subscriber of the channel or the services associated with the content provider.

In one implementation, DVR control unit 430 may determine the threshold amount dynamically, such as determining a customer type associated with the user and determining the threshold based on the customer type. For example, DVR control unit 430 may determine whether the user is a minor (or another individual who is not authorized to incur VOD fees), and may set the threshold to a lower amount (e.g., zero) if the user is a minor and to a relative higher amount if the user is not a minor. In this example, DVR control unit 430 would block a recording request from a minor and provide the minor with access to the digital via VOD only if the VOD version of the digital content is free. DVR control unit 430 may determine the customer type based on an input (e.g., an authentication code) or other data collected by STB 110.

DVR control unit 430 may block recording of the digital contents by the DVR in block 620 by forwarding DVR instructions 401 directing DVR 130 to not record the requested digital content. DVR control unit 430 may further forward a message and/or instruction to STB 110 to present a menu or other interface to initiate access to the digital contents using VOD.

As shown in FIG. 6, process 600 may also include determining whether DVR 130 has sufficient storage capacity to record the selected digital contents (block 630) when the costs for accessing the digital contents are above a threshold amount (block 610—Yes). For example, DVR control unit 430 may determine metadata regarding the digital contents from the EPG data 102 (e.g., determine a play length for the digital content and a format of the digital content, such as determining whether the program is presented in low definition or high-definition). DVR control unit 430 may further interface with DVR 130 to determine an amount of storage space available on DVR 130 and an estimated amount of storage space to be used by DVR 130 to record the digital contents (e.g., based on the length and/or format of the digital contents). DVR 130 may have insufficient space to record the digital contents if, for example, recording the requested digital contents would require DVR 130 to record only a portion of the program before running out of space, erase other stored programs, record the digital contents at a different format (e.g., a lower resolution), and/or reduce the amount of free/available space on DVR 130 below a threshold size. If DVR 130 does not have sufficient storage capacity to record the selected digital contents (block 630—No), DVR controller 120 may block recording of the digital contents by DVR 130 and initiate access to the digital content via VOD in block 620.

Continuing with FIG. 6, process 600 may further include determining whether the version of the digital contents (documents, e-books, audio, video and games, or other data that are stored in a digital format) available on-demand is different from the broadcasted version of the digital contents to be recorded by DVR 130 (block 640), even if DVR 130 has sufficient storage capacity to record the selected digital contents (block 630—Yes) and/or the costs for accessing the digital contents via VOD are greater than the threshold amount (block 610—Yes). For example, DVR control unit 430 may access EPG data (e.g., received from EPG unit 410) to obtain metadata (e.g., a running length, a rating, etc.) associated with the digital contents, and DVR control unit 430 may further collect metadata regarding the VOD version (e.g., from VOD catalog data received from VOD catalog unit 420). DVR control unit 430 may compare the metadata regarding the VOD and the broadcast versions of the digital contents and may determine whether the VOD version and the broadcast version (to be recorded by DVR 130) differ based on the comparison. DVR control unit 430 may further determine, for example, whether the VOD version potentially omits commercial breaks present in the broadcast version of the selected channel. For example, DVR controller 120 may determine that the VOD version does not include the commercial breaks present in the broadcast version if the VOD version is significantly shorter in duration than the broadcast version.

If the on-demand and broadcast versions of the digital contents are substantially similar (block 640—No), DVR controller 120 may allow (e.g., not block) recording of the requested digital contents (e.g., documents, e-books, audio, video and games, or other data that are stored in a digital format) by DVR 130 in block 650. For example, DVR controller 120 may forward data to DVR 130 to initiate the recording the requested digital content. For example, DVR controller 120 may forward information to STB 110 and/or DVR 130 identifying the channel and time associated with the requested digital content.

In another example, DVR controller 120 may examine metadata associated with the broadcast version to determine whether the broadcast version includes desirable features that may not be available through the VOD version. For example, a user may prefer to record a broadcast of a live event, such as a sporting event, concert, or news broadcast, instead of viewing an edited VOD version of the event. In another example, DVR controller 120 may determine whether the broadcast version (e.g., broadcast in a particular language) is preferable for a type of user (e.g., a user associated with the particular language) in comparison to the VOD version that is available in an original, different language. In these examples, DVR controller 120 may allow DVR 130 to record the requested digital contents in block 650 even though the VOD and broadcast versions of the digital contents may substantially differ (block 640—Yes).

As shown in FIG. 6, process 600 may include determining whether network conditions (e.g., a status of provider network 150) support VOD access to the digital contents (block 660) when other determinations in process 600 suggest that VOD access to the digital contents may be preferable to recording the digital contents with DVR 130 (e.g., if the VOD and broadcast versions of the digital contents are substantially different (block 640—Yes). For example, DVR controller 120 may determine whether a particular content provider 180 providing the VOD content is available and whether there is sufficient bandwidth between the particular content provider 180 and customer premises 101 to support the VOD access of the digital contents. If network conditions do not support VOD access of the digital contents, (block 660—No), DVR controller 120 may allow DVR 130 to record the requested digital contents (block 650). Otherwise, if network conditions support VOD access to the requested digital contents, (block 660—Yes), DVR controller 120 may initiate VOD access to the digital contents (block 670). For example, DVR controller 120 may send a message to STB 110 to present (e.g., on display device 140) a menu to enable the user to request VOD access to the digital contents.

FIGS. 7A-7E show an exemplary display 700 (shown in FIGS. 7A-7E as displays 700-A through 700-E) that may be generated by STB 110 and presented by display device 140 in implementations described herein. As shown in FIGS. 7A-7E, display 700 may include, for example, EPG interface 710, a program selection indication 720, a DVR menu 730, and a VOD message window 740 (shown in FIGS. 7B-7E as VOD message windows 740-1 through 740-4).

As shown in FIGS. 7A-7E, display 700-A may present EPG interface 710. EPG interface may include data identifying programs shown on different channels. In the example shown in FIG. 7A, EPG interface 710 may include a table form with different channels associated with rows (the channels may be identified in the left column of EPG interface 710), and different times associated with columns (the times may be identified in a top row of EPG interface 710). Each of the entries in EPG interface 710 may identify programming available on a corresponding channel at a corresponding time. A user may navigate within EPG interface 710 to view different channels and/or times. For example, a user may submit an input (e.g., via a remote control device) to move up or down to select between different channels or move left or right to select between different times.

As further shown in FIGS. 7A-7E, program selection indication 720 may provide a graphical indication of a channel and/or time selected by a user within EPG interface 710. For example, program selection indication 720 may include a particular color, brightness, font, graphical symbol, or other indication to distinguish the selected program from other programs identified within EPG interface 710.

Selection of a particular program in EPG interface 710 (e.g., as indicated by program selection indication 720) may cause display 700 to present DVR menu 730. DVR menu 730 may present options available to a user related to recording the selected program, such as to "Record Show;" "Record Show with Options;" "Record Series;" and "Record Series with Options," as shown in FIGS. 7A-7E. The "Record Show" selection may cause STB 110 to forward a message to DVR controller 120 to cause DVR 130 to record the selected program (e.g., the digital contents being presented by the particular station at the particular time), and the "Record Show with Options" selection may cause STB 110 to forward a message to DVR controller 120 to cause DVR 130 to record the selected program with additional options, such as to record the program in a particular format and/or to control how long DVR 130 stores the recorded program before erasing the program. Similarly, the "Record Series" selection may cause STB 110 to forward a message to DVR controller 120 to cause DVR 130 to record a series that includes the selected program and additional programs with a similar identifier, and the "Record Series with Options" selection may cause STB 110 to forward a message to DVR controller 120 to cause DVR 130 to record the selected series with additional options, such as to instruct DVR 130 to record programs in the series that were previously recorded and/or shown on the channel.

As shown in FIGS. 7B-7E, DVR controller 120 may cause STB 110 to present various messages within VOD message window 740 based on one or more determinations made in processes 500 and/or 600. In the example shown in FIG. 7B, if DVR controller 120 determines that selected digital contents (e.g., selected via for recording by EPG interface 710 and DVR menu 730) is also available via VOD (block 530—Yes), DVR controller 120 may cause STB 110 to display VOD message window 740-1 indicating that "A selected program to record is available through Video on Demand."

Figure 7C:
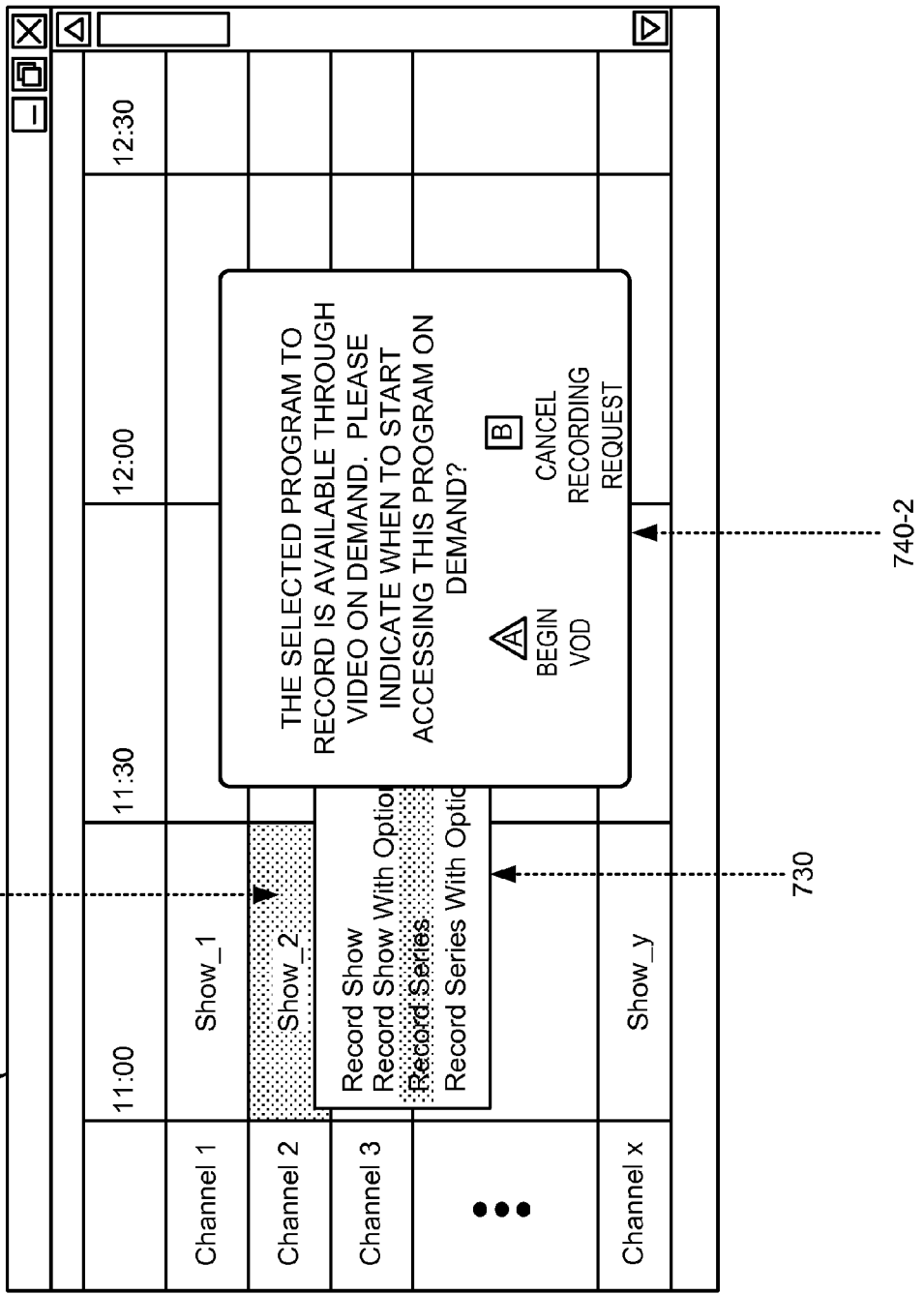

As shown in FIG. 7C, if DVR controller 120 determines to block recording of the selected program by DVR 130 and to provide access to the selected program via VOD (e.g., in block 620), DVR controller 120 may cause STB to display VOD message window 740-2 indicating that "The selected program to record is available through video-on-demand. Please indicate when to start accessing this program on demand." In the example shown in FIG. 7C, VOD message window 740-2 may further include instructions directing the user on how to access the VOD content (Press button A to "Access VOD") or instructions to cancel the request to record the program (Press button B to "Cancel Recording Request").

Figure 7D:
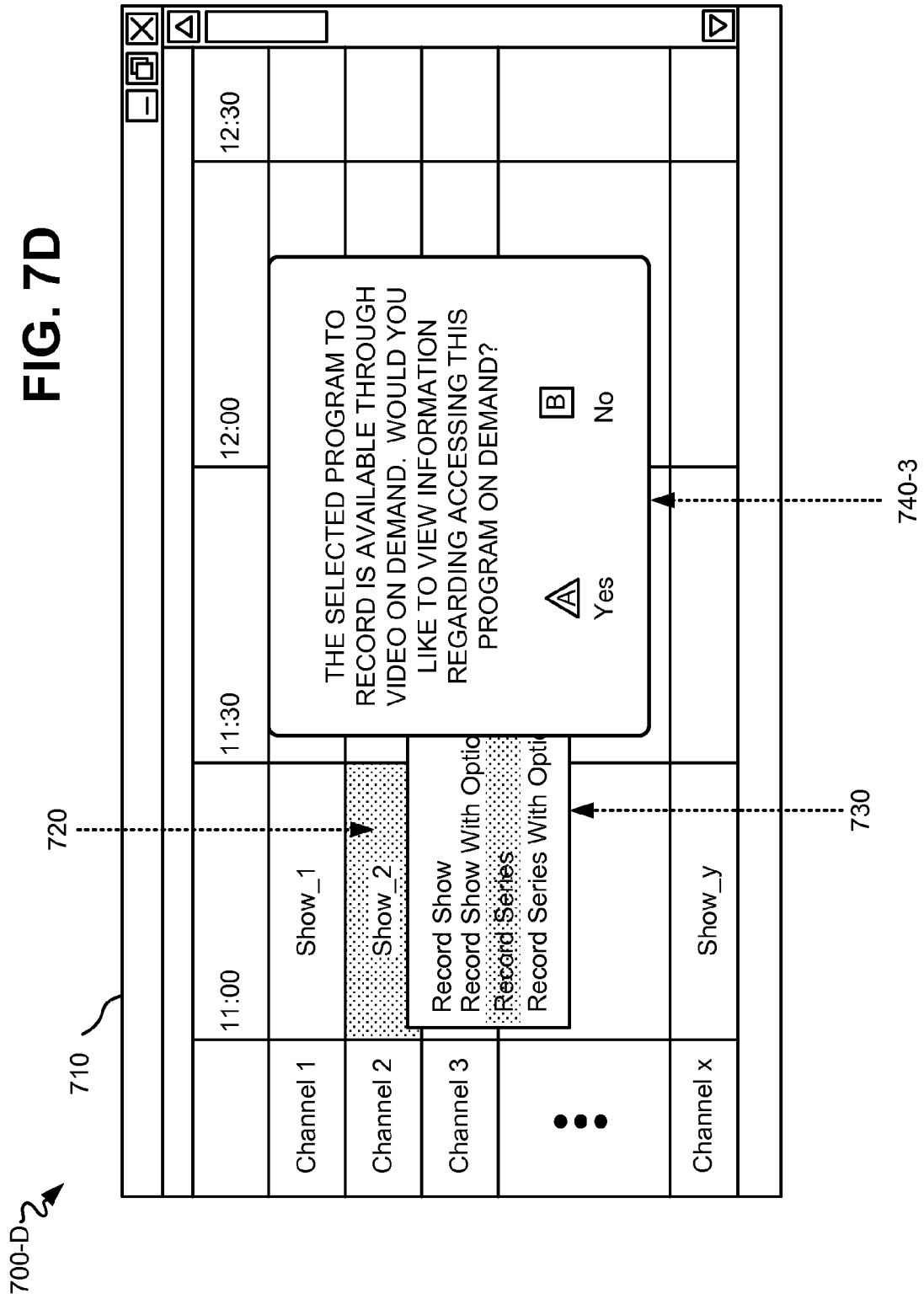

As shown in FIG. 7D, if DVR controller 120 determines to present an option to access the selected program by DVR 130 (e.g., in block 670), DVR controller 120 may cause STB to display VOD message window 740-3 indicating that "The selected program to record is available on demand. Would you like to view information regarding accessing this program via video on demand?" In the example shown in FIG. 7D, VOD message window 740-3 may further prompt the user to submit an input to make a selection regarding accessing the VOD content (Press button A to indicate "Yes" about accessing the VOD content or Press button B to indicate "No" about accessing the VOD content).

Figure 7E:
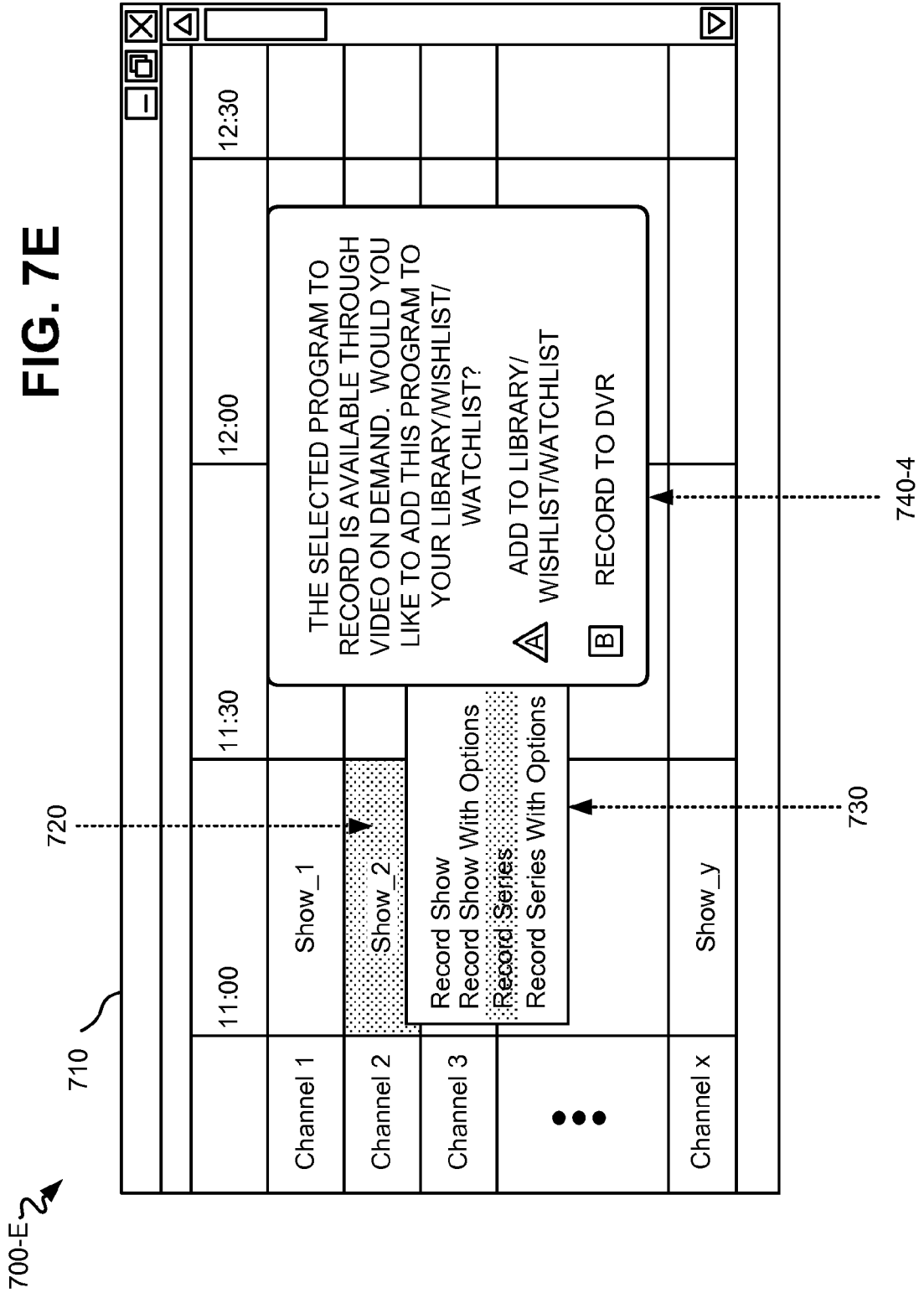

In the example shown in FIG. 7E, if DVR controller 120 determines that selected digital contents (e.g., selected via for recording by EPG interface 710 and DVR menu 730) is also available via VOD (block 530-Yes), DVR controller 120 may cause STB 110 to display VOD message window 740-4 indicating that "The selected program to record is available through video-on-demand. Would you like to add this program to your library/wishlist/watchlist?" The VOD message window 740-4 in FIG. 7E may further prompt the user to make a related selection (e.g., Press button A to "Add To Library/Wishlist/Watchlist?") to store information (e.g., data identifying a title, broadcast show time, VOD pricing data, etc.) regarding the digital contents or a selection (Press button B to "Record to DVR") to continue to record the selected digital content even though the program is identified as being available on demand. If the option A, in this example, is selected, DVR controller 120 may prevent DVR 130 from recording the program, but the stored metadata (e.g., the library, wishlist, and/or watchlist) may enable the user to tune to a later broadcast of the digital contents, to order the digital contents on demand, to identify the program, etc.

Although FIGS. 7A-7E shows exemplary elements of display 700, in other implementations, display 700 may include fewer elements, different elements, differently arranged elements, or additional elements than those depicted in FIGS. 7A-7E.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 5 and 6, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a processor, a request for a digital video recorder (DVR) to record digital contents, wherein the digital contents are broadcast on a channel at a particular time, and wherein the request is received from a user;
    identifying, by the processor, the digital contents being presented on the channel at the particular time;
    determining, by the processor and based on identifying the digital contents, whether the digital contents are available via video on demand (VOD);
    when the digital contents are available via VOD, determining, by the processor, whether to block recording of the digital content by the DVR, wherein determining whether to block the recording of the digital content by the DVR includes:
        determining a cost associated with accessing the digital content via VOD, wherein determining the cost includes:
            identifying a content provider associated with the digital contents,
            accessing a customer profile associated with the user, and
            determining, based on the customer profile, whether the user subscribes to the content provider, wherein the cost is a first cost when the user subscribes to the content provider, and the cost is a second cost that is greater than the first cost when the user does not subscribe to the content provider,
        determining whether the user is a minor,
        determining a threshold value, wherein the threshold value is a first value when the user is a minor, and the threshold value is a second value that is higher than the first value when the user is not a minor, and
        determining to block recording of the digital content by the DVR when the cost is less than the threshold value; and
    generating, by the processor, instructions to the DVR based on determining whether to block the recording of the digital content by the DVR.

2. The method of claim 1, wherein identifying the digital contents includes:
    accessing, based on the channel and the particular time, an electronic program guide to identify metadata associated with the digital contents; and
    identifying the digital contents based on the metadata associated with the digital contents.

3. The method of claim 2, wherein the metadata associated with the digital contents includes first metadata, and wherein determining whether the digital contents are available via VOD includes:
    determining second metadata regarding a program available via VOD;
    comparing the first metadata and the second metadata; and
    determining that the digital contents are available via VOD when the first metadata corresponds to the second metadata.

4. The method of claim 1, wherein determining whether to block recording of the digital content by the DVR further includes:
    determining whether the DVR has sufficient storage capacity to store the digital contents; and
    determining to block recording of the digital content by the DVR when the DVR has insufficient storage capacity to store the digital contents.

5. The method of claim 4, wherein the channel presents a first version of the digital content at the particular time and VOD provides a second version of the digital contents, and wherein the method further comprises:
    determining whether the first version and the second version differ;
    determining whether a network condition at the particular time supports VOD access to the digital contents;
    presenting an option to access the digital content via VOD when the first version and the second version differ and when the network condition supports VOD access to the digital contents; and
    allowing the DVR to record the digital content when the network condition does not support VOD access to the digital contents or when the first version and the second version do not differ.

6. The method of claim 1, wherein determining whether to block recording of the digital content by the DVR further includes:
    determining whether a first version of the digital contents on the channel at the particular time differs from a second version of the digital contents available via VOD; and
    determining to block recording of the digital content by the DVR when the first version and the second version differ.

7. The method of claim 1, wherein determining whether to block recording of the digital content by the DVR further includes:
    determining a network condition associated with the particular time;
    determining whether the network condition supports VOD access to the digital contents; and
    allowing the DVR to record the digital content on the channel when the network condition does not support VOD access to the digital contents.

8. A device, comprising:
    a memory configured to store instructions; and
    a processor configured to implement one or more of the instructions to:
        receive a request for a digital video recorder (DVR) to record digital contents, wherein the digital contents are broadcast on a channel at a particular time, and wherein the request is received from a user;
        identify the digital contents being presented on the channel at the particular time;
        determine, based on identifying the digital contents, whether the digital contents are available via video on demand (VOD);
        when the digital contents are available via VOD, determine whether to block recording of the digital content by the DVR, wherein the processor, when determining whether to block the recording of the digital content by the DVR, is further configured to:
            determine a cost associated with accessing the digital content via VOD, wherein the processor, when determining the cost, is further configured to:
                identify a content provider associated with the digital contents, accessing a customer profile associated with the user, and determine, based on the customer profile, whether the user subscribes to the content provider, wherein the cost is a first cost when the user subscribes to the content provider, and the cost is a second cost that is greater than the first cost when the user does not subscribe to the content provider, determine whether the user is a minor, determine a threshold value, wherein the threshold value is a first value when the user is a minor, and the threshold value is a second value that is higher than the first value when the user is not a minor, and determine to block recording of the digital content by the DVR when the cost is less than the threshold value; and generate instructions to the DVR based on determining whether to block the recording of the digital content by the DVR.

9. The device of claim 8, wherein the processor, when identifying the digital contents, is further configured to:

access, based on the channel and the particular time, an electronic program guide to identify metadata associated with the digital contents; and identify the digital contents based on the metadata.

10. The device of claim 9, wherein the metadata associated with the digital contents includes first metadata, and wherein the processor, when determining whether the digital contents are available via VOD, is further configured to:

determine second metadata regarding a program available via VOD;

compare the first metadata and the second metadata; and determine that the digital contents are available via VOD when the first metadata corresponds to the second metadata.

11. The device of claim 8, wherein the processor, when determining whether to block recording of the digital content by the DVR, is further configured to:

determine whether the DVR has sufficient storage capacity to store the digital contents; and determine to block recording of the digital content by the DVR when the DVR has insufficient storage capacity to store the digital contents.

12. The device of claim 11, wherein the channel presents a first version of the digital content at the particular time and VOD provides a second version of the digital contents, and wherein the processor is further configured to:

determine whether the first version and the second version differ;

determine whether a network condition at the particular time supports VOD access to the digital contents;

present an option to access the digital content via VOD when the first version and the second version differ and when the network condition supports VOD access to the digital contents; and allow the DVR to record the digital content when the network condition does not support VOD access to the digital contents or when the first version and the second version do not differ.

13. The device of claim 8, wherein the processor, when determining whether to block recording of the digital content by the DVR, is further configured to:

determine whether a first version of the digital contents on the channel at the particular time differs from a second version of the digital contents available via VOD, and determine to block recording of the digital content by the DVR when the first version and the second version differ.

14. The device of claim 8, wherein the processor, when determining whether to block recording of the digital content by the DVR, is further configured to:

determine network conditions associated with the particular time;

determine whether the network conditions supports VOD access to the digital contents; and allow the DVR to record the digital content when the network conditions do not support access to the digital contents via VOD.

15. A computer-readable memory device, to store instructions, the instructions comprising:

one or more instructions that, when executed by a processor, cause the processor to:

receive a request for a digital video recorder (DVR) to record digital contents, wherein the digital contents are broadcast on a channel at a particular time, and wherein the request is received from a user;

identify the digital contents being presented on the channel at the particular time;

determine, based on identifying the digital contents, whether the digital contents are available via video on demand (VOD);

when the digital contents are available via VOD, determine whether to block recording of the digital content by the DVR, wherein the one or more instructions cause the processor, when determining whether to block the recording of the digital content by the DVR, to:

determine a cost associated with accessing the digital content via VOD, wherein determining the cost includes:

identify a content provider associated with the digital contents, access a customer profile associated with the user, and determine, based on the customer profile, whether the user subscribes to the content provider, wherein the cost is a first cost when the user subscribes to the content provider, and the cost is a second cost that is greater than the first cost when the user does not subscribe to the content provider, determine whether the user is a minor, determine a threshold value, wherein the threshold value is a first value when the user is a minor, and the threshold value is a second value that is higher than the first value when the user is not a minor, and determine to block recording of the digital content by the DVR when the cost is less than the threshold value; and generate instructions to the DVR based on determining whether to block the recording of the digital content by the DVR.

16. The computer-readable memory device of claim 15, wherein the one or more instructions, when causing the processor to identify the digital contents, further cause the processor to:

access, based on the channel and the particular time, an electronic program guide to identify metadata associated with the digital contents; and identify the digital contents based on the metadata.

17. The computer-readable memory device of claim 16, wherein the metadata associated with the digital contents includes first metadata, and wherein the one or more instructions, when causing the processor to identify the digital contents, further cause the processor to:
- determine second metadata regarding a program available via VOD;
- compare the first metadata and the second metadata; and
- determine that the digital contents are available via VOD when the first metadata corresponds to the second metadata.

18. The computer-readable memory device of claim 15, wherein the one or more instructions, when causing the processor to determine whether to block recording of the digital content by the DVR, further cause the processor to:
- determine whether the DVR has sufficient storage capacity to store the digital contents; and
- determine to block recording of the digital content by the DVR when the DVR has insufficient storage capacity to store the digital contents.

19. computer-readable memory device of claim 18, wherein the channel presents a first version of the digital content at the particular time and VOD provides a second version of the digital contents, and wherein the one or more instructions further cause the processor to:
- determine whether the first version and the second version differ;
- determine whether a network condition at the particular time supports VOD access to the digital contents;
- present an option to access the digital content via VOD when the first version and the second version differ and when the network condition supports VOD access to the digital contents; and
- allow the DVR to record the digital content when the network condition does not support VOD access to the digital contents or when the first version and the second version do not differ.

20. The computer-readable memory device of claim 15, wherein the one or more instructions, when causing the processor to determine whether to block recording of the digital content by the DVR, further cause the processor to:
- determine network conditions associated with the particular time;
- determine whether the network conditions supports VOD access to the digital contents; and
- allow the DVR to record the digital content when the network conditions do not support access to the digital contents via VOD.

* * * * *